(12) United States Patent
Hendry et al.

(10) Patent No.: US 9,257,101 B2
(45) Date of Patent: Feb. 9, 2016

(54) METHOD FOR REDUCING GRAPHICS RENDERING FAILURES

(75) Inventors: Ian Hendry, San Jose, CA (US); Jeffry Gonion, Campbell, CA (US); Jeremy Sandmel, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/620,053

(22) Filed: Sep. 14, 2012

(65) Prior Publication Data

US 2013/0009975 A1 Jan. 10, 2013

Related U.S. Application Data

(63) Continuation of application No. 12/313,718, filed on Nov. 24, 2008, now Pat. No. 8,310,494.

(60) Provisional application No. 61/101,634, filed on Sep. 30, 2008.

(51) Int. Cl.
*G09G 5/399* (2006.01)
*G09G 5/395* (2006.01)
*G06T 1/20* (2006.01)

(52) U.S. Cl.
CPC . *G09G 5/395* (2013.01); *G06T 1/20* (2013.01)

(58) Field of Classification Search
CPC .................................. G09G 5/399; G06T 1/20
USPC ......................................................... 345/539
See application file for complete search history.

(56) References Cited

U.S. PATENT DOCUMENTS

| | | | |
|---|---|---|---|
| 4,862,392 A * | 8/1989 | Steiner | 345/427 |
| 5,459,825 A | 10/1995 | Anderson et al. | |
| 5,543,824 A * | 8/1996 | Priem et al. | 345/539 |
| 5,594,854 A * | 1/1997 | Baldwin et al. | 345/441 |
| 5,657,478 A * | 8/1997 | Recker et al. | 345/503 |
| 5,682,529 A | 10/1997 | Hendry et al. | |
| 5,727,192 A * | 3/1998 | Baldwin | 345/522 |
| 6,094,726 A | 7/2000 | Gonion et al. | |
| 6,229,553 B1 * | 5/2001 | Duluk et al. | 345/506 |
| 6,282,646 B1 | 8/2001 | Hendry et al. | |
| 6,587,116 B1 | 7/2003 | Hendry et al. | |
| 6,806,880 B1 * | 10/2004 | Mukherjee et al. | 345/506 |
| 6,928,543 B2 | 8/2005 | Hendry et al. | |
| 7,019,758 B2 | 3/2006 | Hendry et al. | |
| 7,336,285 B2 | 2/2008 | Hendry et al. | |
| 7,380,116 B2 | 5/2008 | Hendry et al. | |
| 7,395,419 B1 | 7/2008 | Gonion | |
| 2003/0164825 A1 * | 9/2003 | Baldwin et al. | 345/419 |
| 2003/0227460 A1 * | 12/2003 | Schinnerer | 345/539 |
| 2004/0179018 A1 * | 9/2004 | Sabella et al. | 345/536 |

(Continued)

*Primary Examiner* — Stephen R Koziol
*Assistant Examiner* — Robert Craddock
(74) *Attorney, Agent, or Firm* — Fletcher Yoder PC

(57) ABSTRACT

A method and electronic device employing the method of processing a frame of graphics for display is provided that includes developing a frame in a first software frame processing stage following a first vertical blanking (VBL) heartbeat, issuing a command indicating the first stage is complete, and performing a final software frame processing stage without waiting for a subsequent VBL heartbeat. The method may alternatively include performing the final software frame processing stage regardless as to whether a target framebuffer is available, performing all but final hardware frame processing stages regardless as to whether the target framebuffer is in use, and performing the final hardware processing stage if the target framebuffer is not in use.

15 Claims, 8 Drawing Sheets

(56) References Cited

U.S. PATENT DOCUMENTS

| | | |
|---|---|---|
| 2005/0128206 A1* | 6/2005 | Fujimoto .................... 345/539 |
| 2006/0004996 A1 | 1/2006 | Gonion |
| 2008/0034238 A1 | 2/2008 | Hendry et al. |
| 2008/0114968 A1 | 5/2008 | Gonion et al. |
| 2008/0114969 A1 | 5/2008 | Gonion et al. |
| 2008/0165083 A1 | 7/2008 | Brodersen et al. |
| 2008/0165202 A1 | 7/2008 | Brodersen et al. |
| 2008/0229076 A1 | 9/2008 | Gonion |
| 2008/0276064 A1 | 11/2008 | Munshi et al. |
| 2008/0276220 A1 | 11/2008 | Munshi et al. |
| 2008/0276261 A1 | 11/2008 | Munshi et al. |
| 2008/0276262 A1 | 11/2008 | Munshi et al. |
| 2008/0288744 A1 | 11/2008 | Gonion et al. |
| 2008/0288745 A1 | 11/2008 | Gonion et al. |
| 2008/0288754 A1 | 11/2008 | Gonion et al. |
| 2008/0288759 A1 | 11/2008 | Gonion et al. |

\* cited by examiner

METHOD FOR REDUCING GRAPHICS RENDERING FAILURES

This application is a continuation of U.S. application Ser. No. 12/313,718, filed Nov. 24, 2008, entitled "Method for Reducing Graphics Rendering Failures," and further claims benefit of Provisional Application Ser. No. 61/101,634, filed Sep. 30, 2008, entitled "Method for Reducing Graphics Rendering Failures" in the name of Ian Hendry et al.

BACKGROUND OF THE INVENTION

1. Field of the Invention

The present invention relates generally to displaying graphics on an electronic display screen and, more particularly, to preparing graphics for display on an electronic display screen of an electronic device or portable computer system.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

An electronic display screen for an electronic device often displays a new frame of pixels each time the screen refreshes. Each successive frame of pixels may be stored in a portion of memory known as a framebuffer, which holds data corresponding to each pixel of the frame. Before reaching a target framebuffer, each frame is typically processed using both hardware and software.

Often, a stage of frame processing will move forward when the screen refreshes and sends a vertical blanking (VBL) interrupt command, known as a VBL heartbeat. By synchronizing to the VBL heartbeat, frame processing maintains an orderly progression toward a target framebuffer. However, if a particular stage of frame processing takes too long, a VBL heartbeat may occur before the frame is ready to move to the next stage of processing, and the frame may thus be delayed or discarded. Additionally, hardware-based processing may avoid processing a frame while a target framebuffer is in use.

An electronic device may employ multiple layers of frames of pixels, which may be accumulated into a single layer for display on the screen. At least one unique framebuffer may correspond to each layer. Since each frame of each layer may require frame processing prior to accumulation, a failure during frame processing may be magnified, as more than one layer may be affected.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

An electronic device is provided having circuitry configured to efficiently process a frame of graphics for display. In accordance with one embodiment, the electronic device includes a display, memory circuitry with at least one framebuffer, display control circuitry communicably coupled to the memory circuitry and the display, and a central processor communicably coupled to the display control circuitry. The central processor may be configured to run software for a first software frame processing stage and software for a final software frame processing stage. Software for the first software frame processing stage may be configured to perform a first stage in software graphics processing after the display outputs a vertical blanking heartbeat and to issue a command indicating the first software frame processing stage is complete. Without waiting for another vertical blanking heartbeat, software for the final software frame processing stage may be configured to perform a final stage in software graphics processing as soon as the command is issued. Among other things, the electronic device may be a notebook or desktop computer, a portable media player, a portable telephone, or a personal digital assistant.

In accordance with another embodiment, the electronic device includes a display, memory circuitry comprising at least one framebuffer, display control circuitry communicably coupled to the display and the memory circuitry, at least one central processor communicably coupled to the display control circuitry, and at least one graphics processor communicably coupled to the memory circuitry and the at least one central processor. The at least one central processor may be configured to run software for a final software frame processing stage regardless of whether a target framebuffer is in use. The at least one graphics processor may also be configured to conduct frame processing operations not involving rendering to the target framebuffer regardless of whether the target framebuffer is in use, and may be configured to conduct rendering to the target framebuffer if the target framebuffer is not in use. The electronic device may include a network interface, an expansion slot, or non-volatile storage, or any combination thereof.

A technique for processing a frame of graphics is also provided. In accordance with an embodiment, a method of preparing a frame of graphics for display includes developing a frame in a first software frame processing stage following a first vertical blanking heartbeat, issuing a command indicating that the frame is available for further processing, and preparing the frame for hardware graphics processing in a final software frame processing stage without waiting for a second vertical blanking heartbeat. The method may include preparing the frame for hardware graphics processing in the final software frame processing stage regardless of whether a target framebuffer is in use and performing a first hardware frame processing stage regardless of whether the target framebuffer is in use. If the target framebuffer is not in use, the method may include rendering frame data into the target framebuffer. If the target framebuffer is in use, the method may include deferring rendering frame data into the target framebuffer until the target framebuffer is no longer in use (i.e., when a next vertical blanking heartbeat occurs). Rendering frame data into the target framebuffer may include checking a register which tracks whether the target framebuffer is in use to determine whether the target framebuffer is in use.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
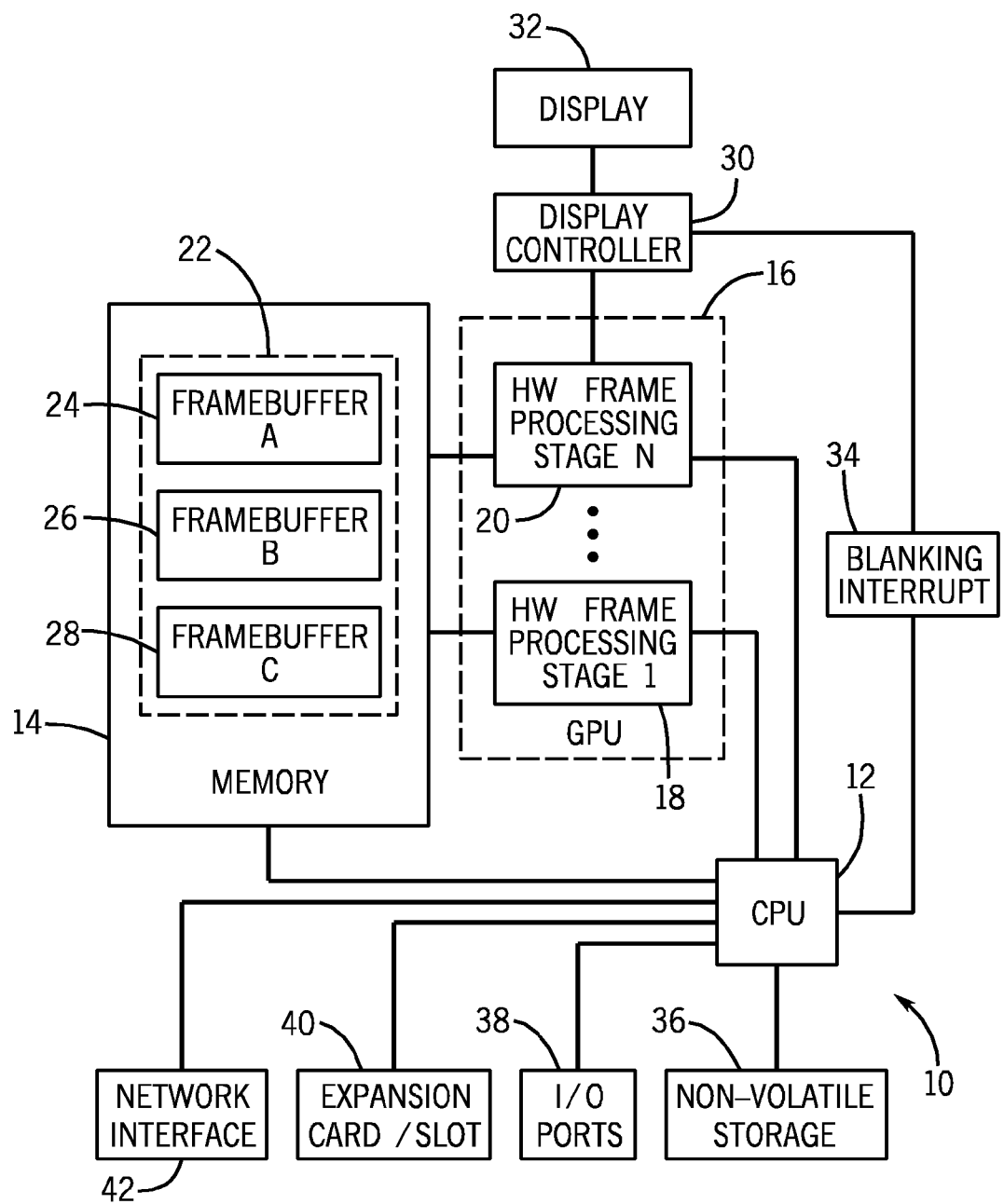
FIG. 1 is a simplified block diagram of an electronic device configured in accordance with an embodiment of the present invention.

Turning to the figures, FIG. 1 illustrates an electronic device 10 in accordance with an embodiment of the present invention. The electronic device 10 may represent a computer system, such as a desktop computer, a notebook computer, or any other variation of computer system. Alternatively, the electronic device 10 may represent a portable device, such as a portable media player or a portable telephone. For example, the electronic device 10 may be a model of an iPod® having a display screen or an iPhone® available from Apple Inc.

The electronic device 10 may include one or more central processing units (CPUs) 12. The CPU 12 may include one or more microprocessors, such as one or more "general-purpose" microprocessors, a combination of general and special purpose microprocessors, and/or ASICS. For example, the CPU 22 may include one or more reduced instruction set (RISC) processors, such as a RISC processor manufactured by Samsung, as well as graphics processors, video processors, and/or related chip sets. The CPU 12 may provide the processing capability to execute an operating system, programs, user interface, graphics processing, and other desired functions.

A memory 14 and a graphics processing unit (GPU) 16 communicate with the CPU 12. The memory 14 generally includes volatile memory such as any form of RAM, but may also include non-volatile memory, such as ROM or Flash memory. In addition to buffering and/or caching for the operation of the electronic device 10, the memory 14 may also store firmware and/or any other programs or executable code needed for the electronic device 10.

The GPU 16 of FIG. 1 may include one or more graphics processors for processing a frame of graphics in a series of stages. The graphics processors of the GPU 16 may perform a variety of hardware graphics processing operations, such as video and image decoding, anti-aliasing, vertex and pixel shading, scaling, rotating, tile acceleration, and/or rendering a frame of graphics data into memory. The series of graphics processing stages may employ any of the above described operations, alone or in combination, in any suitable order. For a given application, such as providing a frame of video graphics, the series of graphics processing stages may begin with a first hardware frame processing stage (1) 18 and end with a final hardware frame processing stage (N) 20, where N represents a total number of graphics processing stages employed for the given application. Each of the hardware frame processing stages of the GPU 16 may take place in one or more multipurpose graphics processors or, alternatively, may take place in one or more specialized graphics processors, such as a shader, video or image decoder, tile accelerator, renderer, etc.

The CPU 12 may supplement hardware graphics processing by providing initial frame data from software running on the CPU 12 to the GPU 16. With the initial frame data, first hardware frame processing stage (1) 18 may complete an initial graphics processing step. Additionally, the CPU 12 may intervene to transfer frame data from one stage to the next or may perform graphics processing in software.

Upon completion of final hardware frame processing stage (N) 20, a completed frame of graphics is rendered into one of the framebuffers 22 within the memory 14. Each of the framebuffers 22 occupies an area of memory reserved for the storage of frame data. Accordingly, the framebuffers 22 may be located in any suitable memory location, including, for example, the memory 14 or dedicated video memory (not shown) within the GPU 16. As depicted in FIG. 1, the electronic device 10 employs three distinct framebuffers 22, allowing the graphics to be triple-buffered. Alternatively, the electronic device 10 may employ a lower or higher number of framebuffers 22 to achieve an appropriate level of graphics buffering.

As depicted in the embodiment of FIG. 1, the electronic device 10 employs triple-buffering of graphics. Accordingly, the final hardware frame processing stage (N) 20 renders a completed frame of graphics into a target framebuffer A 24, framebuffer B 26, or framebuffer C 28. Triple-buffering provides that when one of the three framebuffers 22 is in use for display, the final stage N 20 may render frame data into either of the remaining two framebuffers 22. Because graphics processing may require a variable amount of time to process each frame, triple-buffering generally allows for a steady display of frames despite variances in frame processing times.

A display controller 30 reads the contents of each of the framebuffers 22 sequentially to obtain frames of graphics for display on a display 32. First, the display controller 30 may obtain a frame of graphics from the framebuffer A 24, before sending the frame of graphics for additional processing or directly to the display 32. The display 32 may be any suitable display, such as a liquid crystal display (LCD), a light emitting diode (LED) based display, an organic light emitting diode (OLED) based display, a cathode ray tube (CRT) display, or an analog or digital television. Additionally, the display 32 may also function as a touch screen through which a user may interface with the electronic device 10.

The display 32 displays the frame of graphics for a length of time based on a refresh rate employed by the display 32.

For example, at a refresh rate of 60 Hz, each frame of graphics may be displayed for approximately 16.67 ms. To communicate a start of the display of a new frame, the display controller 30 sends a vertical blanking interrupt 34, also known as a VBL heartbeat, to the CPU 12. The vertical blanking interrupt 34 allows software running on the CPU 12 to synchronize the initial processing of a new frame of graphics with the display of a previous frame of graphics.

The electronic device 10 of FIG. 1 may further include a non-volatile storage 36, input/output (I/O) ports 38, one or more expansion slots and/or expansion cards 40, and a network interface 42. The non-volatile storage 36 may include any suitable non-volatile storage medium, such as a hard disk drive or Flash memory. Because of its non-volatile nature, the non-volatile storage 36 may be well suited to store data files such as media (e.g., music and video files), software (e.g., for implementing functions on the electronic device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), as well as telephone information (e.g., telephone numbers).

The expansion slots and/or expansion cards 40 may expand the functionality of the electronic device 10, providing, for example, additional memory, I/O functionality, or networking capability. By way of example, the expansion slots and/or expansion cards 40 may include a Flash memory card, such as a Secure Digital (SD) card, mini- or microSD, CompactFlash card, or Multimedia card (MMC). Additionally or alternatively, the expansion slots and/or expansion cards 40 may include a Subscriber Identity Module (SIM) card, for use with an embodiment of the electronic device 10 with mobile phone capability.

To enhance connectivity, the electronic device 10 may employ one or more network interfaces 42, such as a network interface card (NIC) or a network controller. For example, the one or more network interfaces 42 may be a wireless NIC for providing wireless access to an 802.11x wireless network or to any wireless network operating according to a suitable standard. The one or more network interfaces 42 may permit the electronic device 10 to communicate with other s utilizing an accessible network, such as handheld, notebook, or desktop computers, or networked printers.

Figure 2:
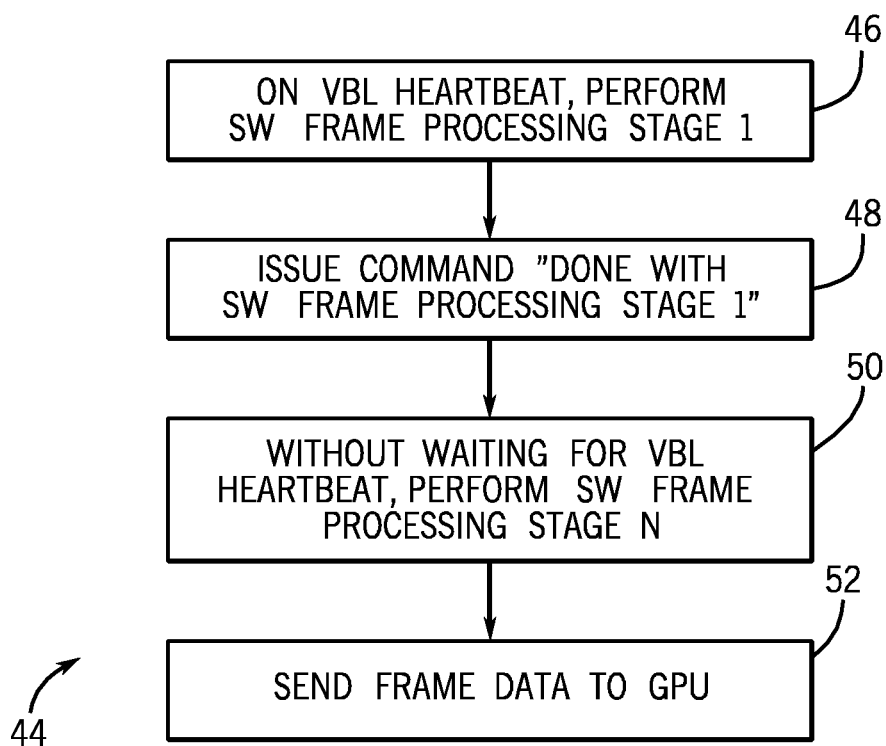
FIG. 2 is a flowchart depicting a method of processing a frame of graphics using the electronic device of FIG. 1 in accordance with an embodiment of the present invention.

Turning to FIG. 2, a flowchart 44 represents a method of preparing an initial frame of graphics using software running on the CPU 12 in accordance with an embodiment of the present invention. The preparation of the frame of graphics may begin with a step 46, when the CPU 12 receive the vertical blanking interrupt 34 from the display controller 30. Subsequently, software running on the CPU 12 performs a first software frame processing stage (1). The first software frame processing stage (1) may generally involve developing a rough outline of a frame of graphics in a software application, but may additionally or alternatively involve any first step appropriate to software graphics processing, such as altering a prior frame or obtaining a frame from an external data source. A target framebuffer A 24, framebuffer B 26, or framebuffer C 28 may also be assigned during the step 46.

As indicated in a step 48, the software that performs the first software frame processing stage (1) subsequently issues a command indicating that the first software frame processing stage (1) has completed. The command may alert other software running on the CPU 12 to immediately begin a next software frame processing stage. In step 50, a final software frame processing stage (N) begins without waiting for a subsequent the vertical blanking interrupt 34.

Though the flowchart 44 depicts an embodiment having a first software frame processing stage (1) and a final software frame processing stage (N), it should be appreciated that appropriate interim software frame processing stages may be employed in alternative embodiments. For example, software performing each interim software frame processing stage may also issue a command indicating that the interim software frame processing stage has completed, such that each subsequent interim stage may begin immediately. When all interim software frame processing stages have completed and a command has issued indicating that the last interim software frame processing stage has completed, the process flow returns to a step 50, and the final software frame processing stage (N) begins.

In the step 50, software running on the CPU 12 performs final software frame processing stage (N). Generally, the final software frame processing stage (N) may involve developing initial frame data for subsequent hardware graphics processing. However, the final software frame processing stage (N) may additionally or alternatively involve any final step appropriate to software graphics processing. It should be appreciated that in alternative embodiments for which hardware graphics processing is unavailable or undesirable, the final software frame processing stage (N) may involve rendering a completed frame of graphics into the target framebuffer A 24, framebuffer B 26, or framebuffer C 28.

Continuing to view the flowchart 44 of FIG. 2, when the final software frame processing stage (N) has completed, a step 52 begins. In the step 52, software running on the CPU 12 sends initial frame data to the first hardware frame processing stage (1) 18 in the GPU 16. The GPU 16 subsequently performs desired hardware frame processing stages employed by the electronic device 10 as described below, before rendering the completed frame of graphics into the target framebuffer A 24, framebuffer B 26, or framebuffer C 28.

Figure 3:
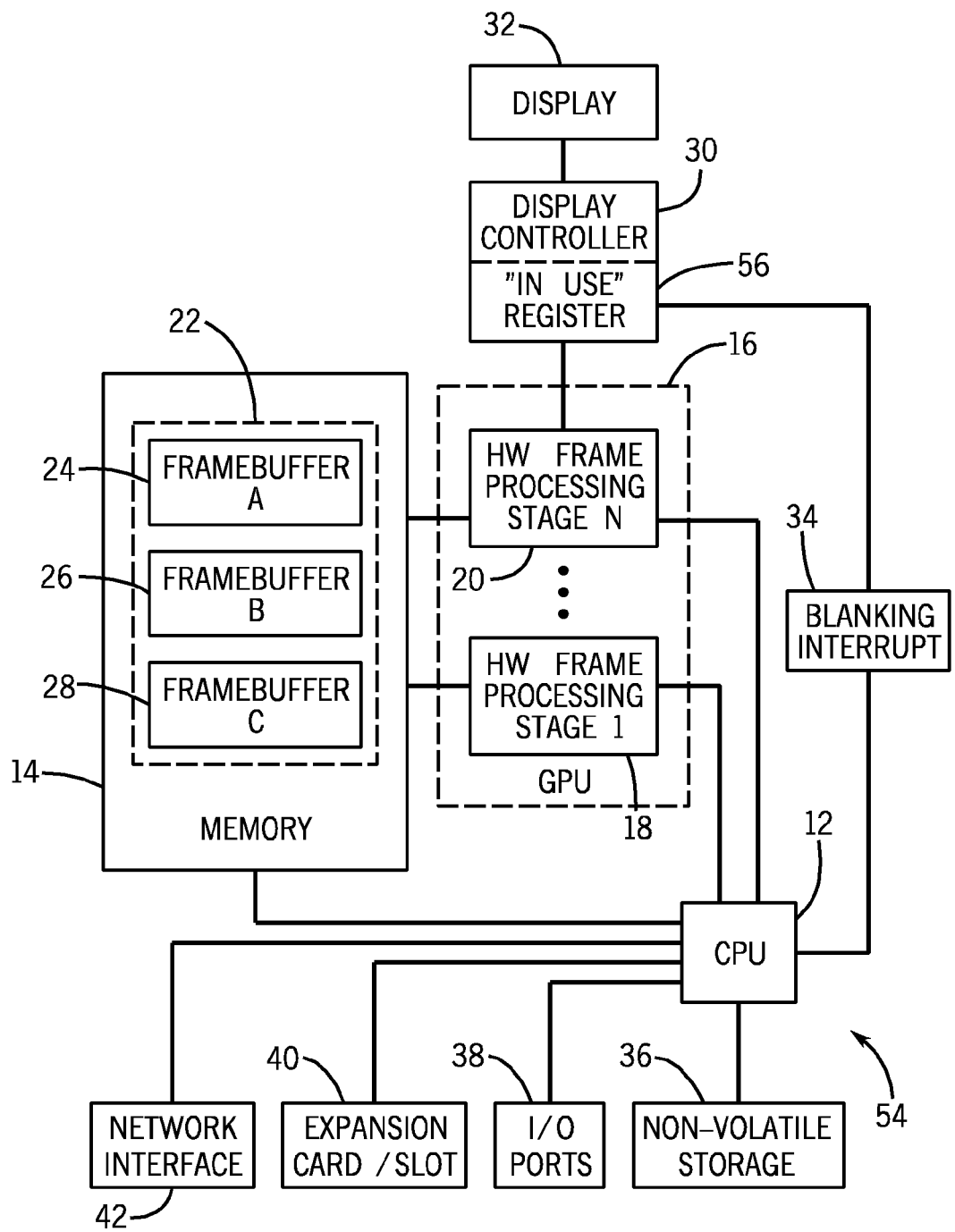
FIG. 3 is a simplified block diagram of an electronic device configured in accordance with another embodiment of the present invention.

FIG. 3 depicts an electronic device 54 having circuitry to track which of the framebuffers 22 is "in use" as the display controller 30 accesses the framebuffer for displaying the contents of the framebuffer on the display 32. With the exception of an "in use" register 56, the electronic device 54 includes features which may perform in the same manner as those of the electronic device 10 of FIG. 1. Accordingly, the above descriptions of features of the electronic device 10 having the same numerals also apply to the electronic device 54. To the extent features of electronic device 54 vary from those of the electronic device 10, such variations are noted below.

As will be appreciated, problems could result if the final hardware frame processing stage (N) attempted to render a completed frame of graphics into one of the framebuffers 22 while the framebuffer were in use. Accordingly, the "in use" register 56 may track which of the framebuffers 22 remain in use at any given time. "In use" register 56 may include a series of bits, where each bit corresponds to one of the framebuffers 22. Each bit of the "in use" register may be set to high if the framebuffer is in use, or set to low if the framebuffer is not in use. As with the electronic device 10, a total number of framebuffers 22 in electronic device 54 may vary depending on the number of graphics layers employed by electronic device 54, and thus a total number of bits held by "in use" register 56 may vary accordingly. For example, if electronic device 54 employed five layers, each layer being triple-buffered, then framebuffers 22 would include a total of 15 framebuffers and "in use" register 56 would include at least 15 bits. Accordingly, "in use" register 56 may contain as many bits as necessary to at least equal the total number of framebuffers 22.

Figure 4:
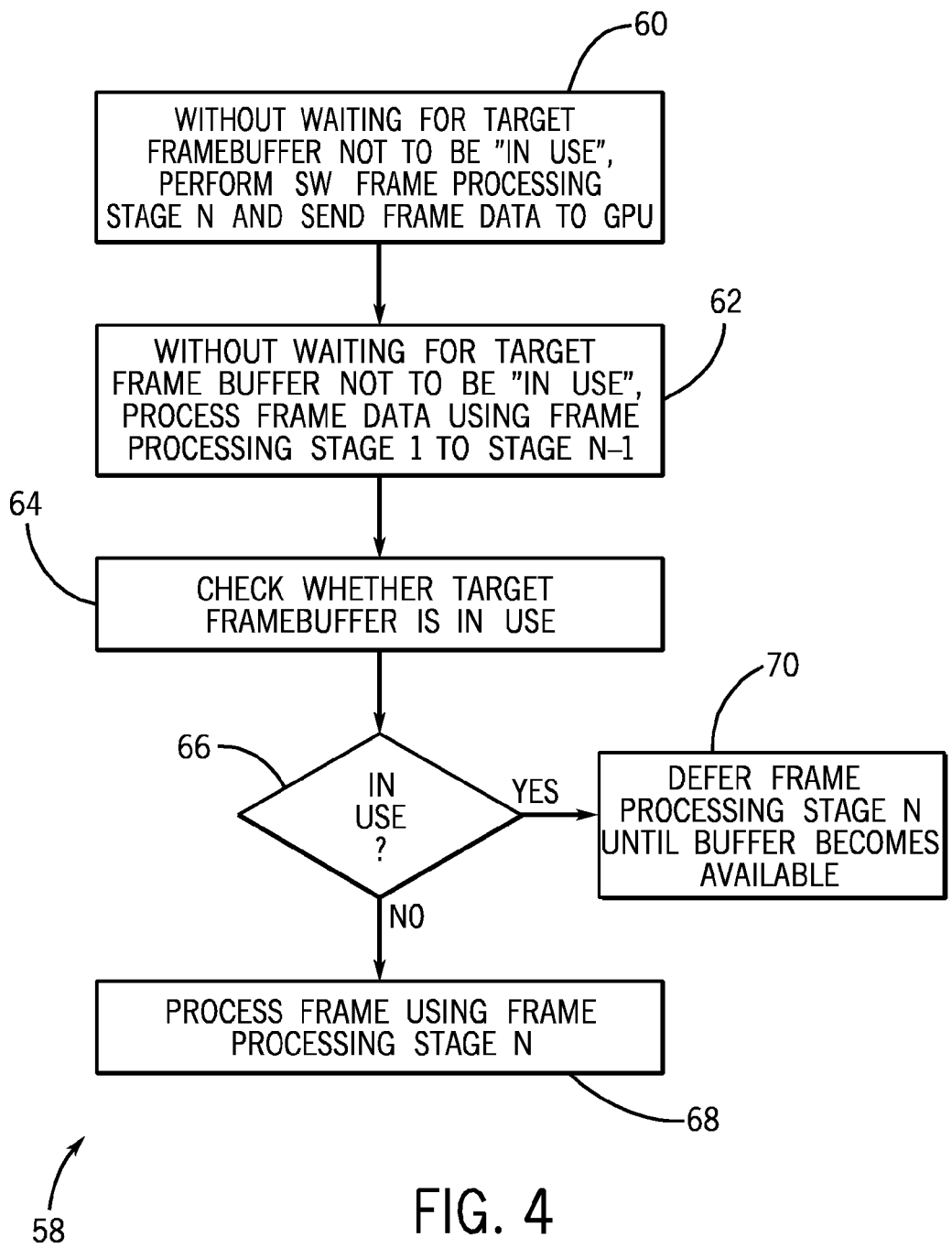
FIG. 4 is a flowchart depicting a method of processing a frame of graphics using the electronic device of FIG. 3 in accordance with an embodiment of the present invention.

FIG. 4 depicts a method 58 with which the "in use" register 56 may prevent the final hardware frame processing stage (N) 20 from rendering into one of the framebuffers 22 if the framebuffer is in use, while allowing hardware graphics processing to progress as quickly as possible. Beginning with a step 60, software running on the CPU 12 performs the final software frame processing stage (N). As discussed above, a frame may already have been assigned to a target framebuffer A 24, framebuffer B 26, or framebuffer C 28 prior to hardware graphics processing. Rather than wait until the target framebuffer is not in use, the final software frame processing stage (N) begins as soon as possible, sending initial frame data to the GPU 16.

In a step 62, the GPU 16 begins the first hardware frame processing stage (1) 18 regardless of whether the target framebuffer A 24, framebuffer B 26, or framebuffer C 28 remains in use. When the first hardware frame processing stage (1) 18 has completed, the GPU 16 may subsequently perform any interim hardware frame processing stages prior to final hardware frame processing stage (N) 20, also regardless of whether the target framebuffer remains in use.

A step 64 indicates that the GPU 16 or the CPU 12 may next check whether the target framebuffer is in use. In one embodiment, software running on the CPU 12 may be alerted that frame data is ready for the final hardware frame processing stage (N) 20. In another embodiment, the GPU 16 may manage the transfer of frame data to the final hardware frame processing stage (N) 20 in lieu of the software. In either embodiment, the software on the CPU 12 or the GPU 16 may send the frame data to the final hardware frame processing stage (N) 20 with a command stream, which may indicate that final hardware frame processing stage (N) 20 may not begin until a bit from the "in use" buffer 56 corresponding to the target framebuffer has cleared.

The command stream may include, for example, 32 bits to correspond to an equal number of bits held by the "in use" buffer 56, though the command stream may encompass any appropriate size. Further, at least one bit corresponding to the target framebuffer in the command stream may be set to indicate to the final hardware frame processing stage (N) 20 that a corresponding bit held by the "in use" register 56 must be clear before proceeding.

As indicated by a decision block 66, the final hardware frame processing stage (N) 20 next compares the command stream with the "in use" buffer 56. If the bit corresponding to the target framebuffer in the "in use" buffer 56 indicates the target framebuffer is in use, the process may instead flow to a step 68 and the final hardware frame processing stage (N) 20 may begin immediately. In accordance with the decision block 66, if the bit corresponding to the target framebuffer in the "in use" buffer 56 indicates the target framebuffer is in use, the process may instead flow to a step 70. In the step 70, the final hardware frame processing stage (N) 20 is deferred until the buffer is no longer in use (i.e., when the next vertical blanking interrupt 34 occurs).

Figure 5:
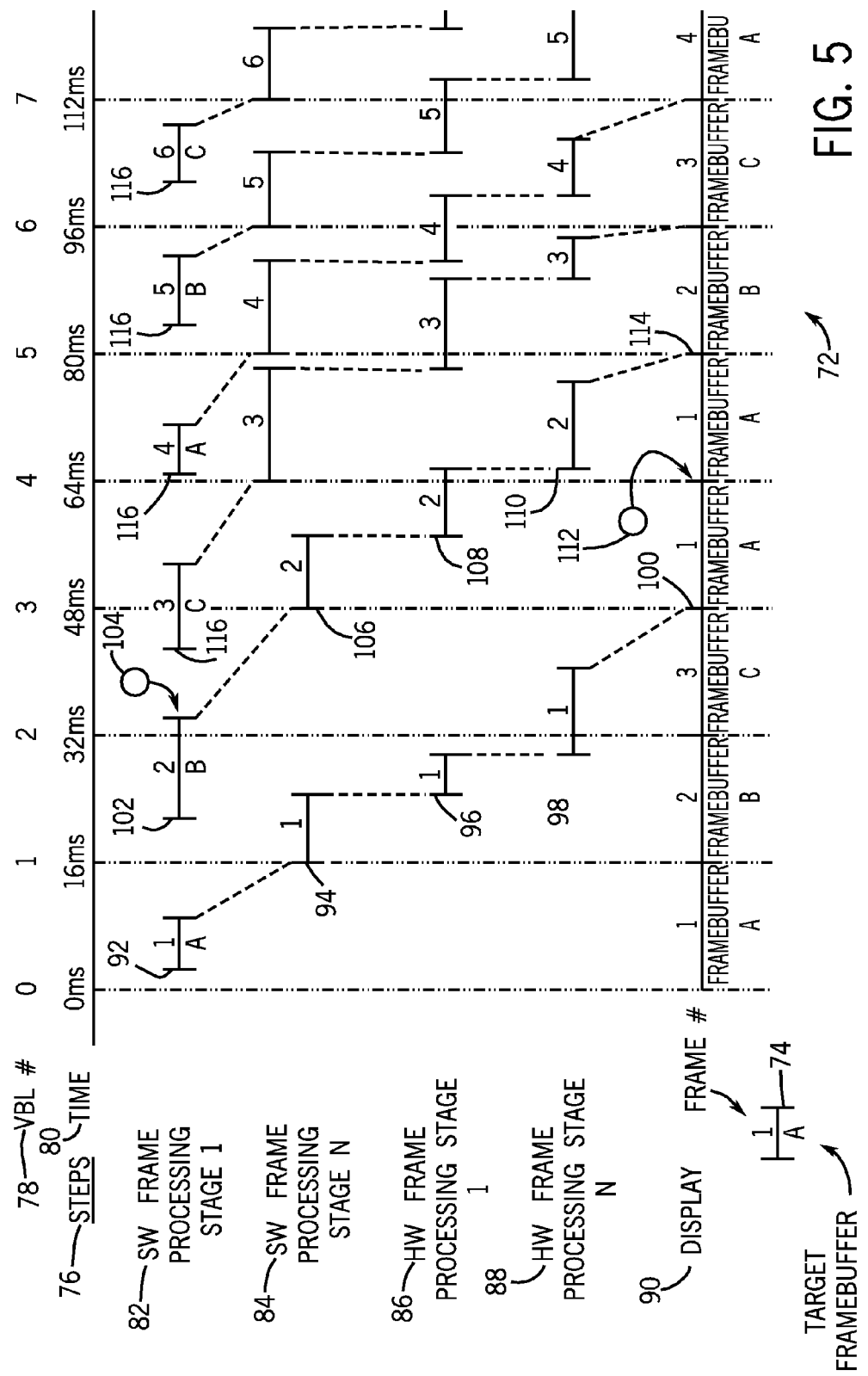
FIG. 5 is a timing diagram illustrating a sequence of processing a series of frames of graphics.

FIGS. 5-8 depict timing diagrams illustrating a sequence of processing a series of frames of graphics. FIG. 5 depicts a particular timing diagram 72, to be discussed in greater detail below. However, it should be noted that the features enumerated 74-90 remain common to all FIGS. 5-8. In a legend 74, a particular frame is identified by a number above a horizontal line punctuated by vertical lines, and a particular target framebuffer is identified beneath the horizontal line. A series of steps 76 for processing a frame of graphics is juxtaposed against VBL heartbeats 78 and time 80. Assuming a display refresh rate of 60 Hz, each VBL heartbeat 78 represents approximately 16.67 ms of time 80.

The series of steps 76 include a first software frame processing stage (1) 82, a final software frame processing stage (N) 84, a first hardware frame processing stage (1) 86, a final hardware frame processing stage (N) 88, and a display stage 90. Each of the series of steps 76 corresponds to those previously discussed above.

The timing diagram 72 of FIG. 5 illustrates one potentially negative result which may occur if the methods depicted in the flowcharts 44 and 58 are not employed. Looking first to a point 92, a frame 1 with a target framebuffer A 24 is developed in the first software frame processing stage (1) 82 following an initial VBL heartbeat (numbered 0). At a point 94, because the method of the flowchart 44 is not employed, the final software frame processing stage (N) 84 will not begin to process frame 1 until after a next VBL heartbeat (numbered 1) occurs. The final software frame processing stage (N) 84 completes and initial frame data for frame 1 is sent to first hardware frame processing stage (1) 86 at a point 96. At a point 98, the final hardware frame processing stage (N) 88 begins, and upon completion of the hardware frame processing stage (N) 88, a completed frame 1 data is rendered into the target framebuffer A 24. A point 100 represents the point at which the display controller 30 reads the contents of framebuffer A 24 for the display step 90, during which time the framebuffer A 24 is in use.

Looking next to a point 102, a frame 2 with a target framebuffer B 26 is developed in the first software frame processing stage (1) 82 following the VBL heartbeat numbered 1. However, as indicated by a balloon 104, the first software frame processing stage (1) 82 does not process frame 2 in a timely manner before a next VBL heartbeat (numbered 2). Because the method of the flowchart 44 is not employed, the final software frame processing stage (N) 84 will begin only after a next VBL heartbeat (numbered 3) occurs at a point 106. Though subsequent frame processing stages may transfer frame 2 immediately after completion at points 108 and 110, the final hardware frame processing stage (N) 88 does not render the completed frame 2 data into framebuffer B 26 until after a subsequent VBL heartbeat (numbered 4). As indicated by a balloon 112, the display controller 30 compensates by repeating the display step 90 for frame 1 in the framebuffer A 24 until a next VBL heartbeat (numbered 5). When the VBL heartbeat numbered 5 occurs at a point 114, the display controller 30 subsequently reads the contents of framebuffer B 26 to display the frame 2.

Points 116 represent subsequent frames 3, 4, 5, 6, which are developed and targeted to the framebuffer C 28, the framebuffer A 24, the framebuffer B 26, and the framebuffer C 28, respectively. In the timing diagram 72, the subsequent frames at points 116 execute as desired.

Figure 6:
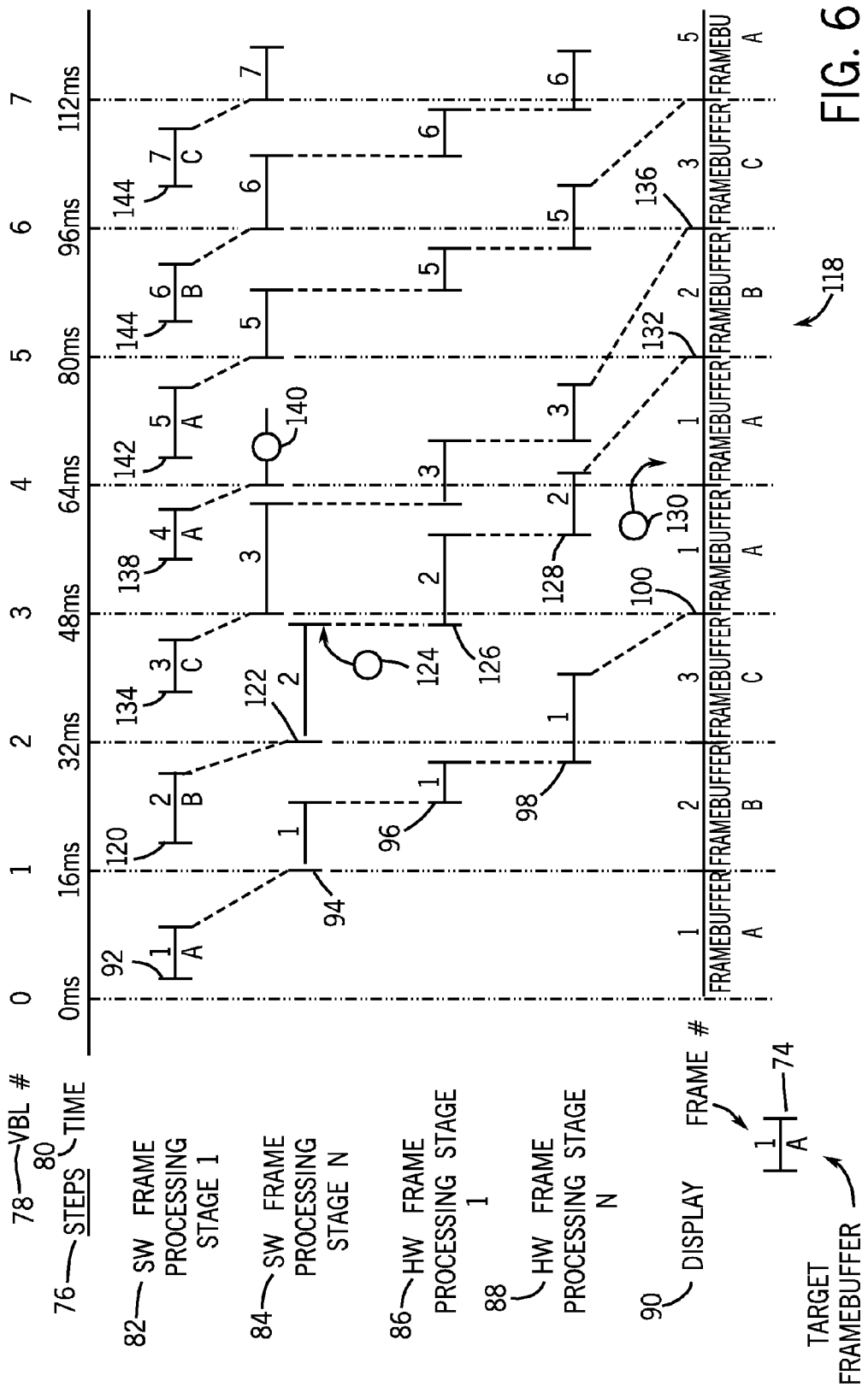
FIG. 6 is a timing diagram illustrating a sequence of processing a series of frames of graphics.

Turning to FIG. 6, a timing diagram 118 illustrates another potentially negative result which may occur if the methods depicted in flowcharts 44 and 58 are not employed. Because elements of the timing diagram 118 numbered 74-100 are addressed in the above discussion of the timing diagram 72 of FIG. 5, the discussion of elements numbered 74-100 is not reproduced in the discussion of FIG. 6 below.

Looking first to a point 120, a frame 2 with a target framebuffer B 26 is developed in the first software frame processing stage (1) 82 following a VBL heartbeat numbered 1. Because the method of the flowchart 44 is not employed, upon the occurrence of a next VBL heartbeat (numbered 2) at a point 122, the final software frame processing stage (N) 84 begins.

As noted by a balloon 124, the final software frame processing stage (N) 84 does not complete the processing of frame 2 in a timely manner. As a result, at points 126 and 128, the sum of all processing time for the final software frame processing stage (N) 84, first frame processing stage 1 86, and final frame processing stage N 88 may exceed the total processing time afforded by triple-buffering. Thus, as indicated by a balloon 130, the display controller 30 compensates by repeating the display step 90 for frame 1 in the framebuffer A 24 until a next VBL heartbeat (numbered 5). When the VBL heartbeat numbered 5 occurs at a point 132, the display controller 30 subsequently reads the contents of the framebuffer B 26 to display frame 2.

At a point 134, a frame 3 with a target framebuffer C 28 is developed, which continues as desired to the display step 90 at a point 136. A subsequent frame 4 with a target framebuffer A 24 is developed in the first software frame processing stage (1) 82 at a point 138. However, because the method of the flowchart 58 is not employed, the final software frame processing stage (N) 84 may not begin because the target framebuffer A 24 is in use. As indicated by a balloon 140, the frame 4 may be dropped as a result. Instead, as depicted at point 142, a frame 5 may be developed having the target framebuffer A 24. Though subsequent frames at points 144 may continue to execute as desired, the same problem may subsequently reoccur.

Figure 7:
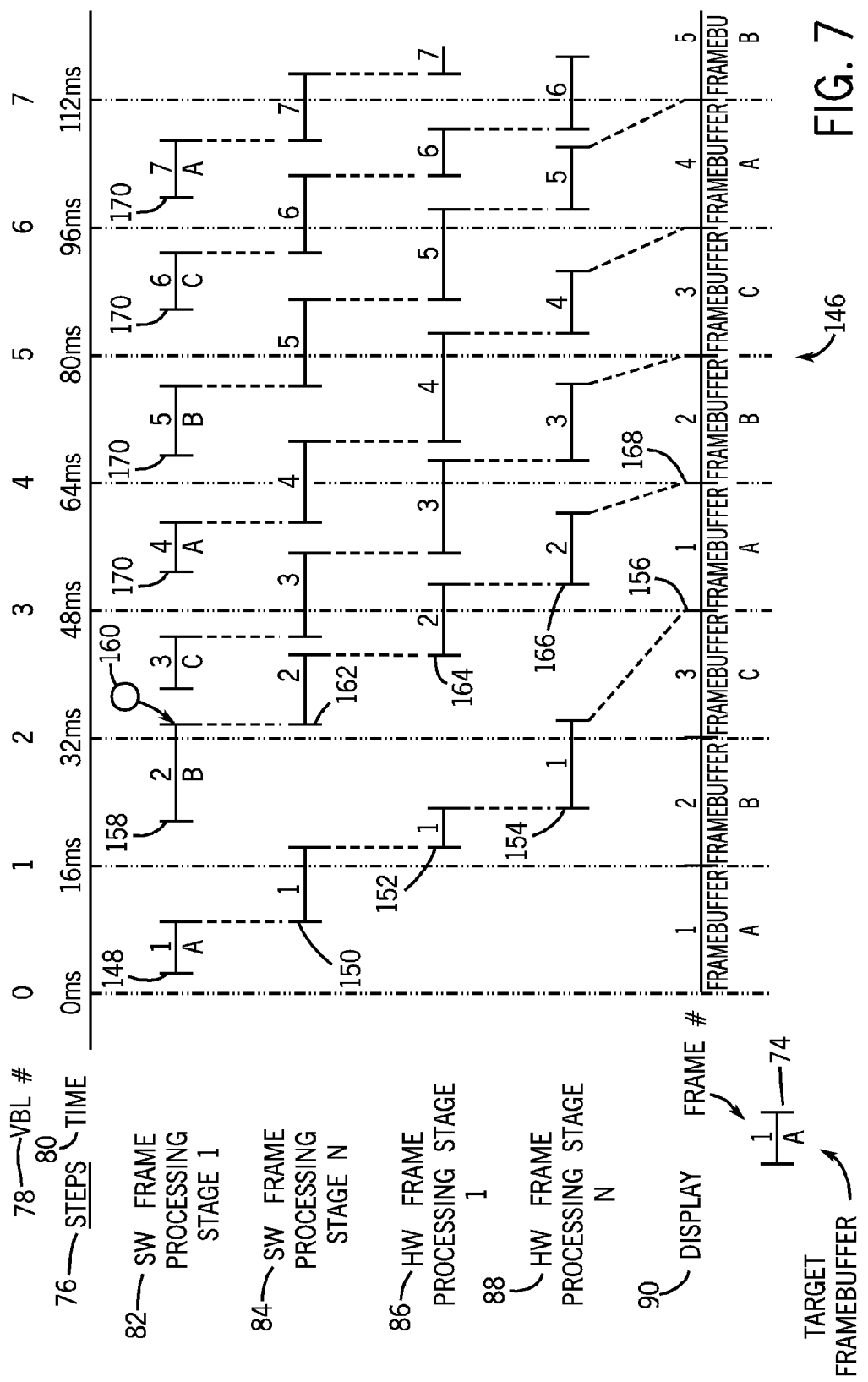
FIG. 7 is a timing diagram illustrating a sequence of processing a series of frames of graphics.

FIG. 7 depicts a timing diagram 146, which demonstrates that employing the methods depicted in the flowcharts 44 and 58 may solve potential problems illustrated in the timing diagrams 72 and 118 of FIGS. 5 and 6. Because elements of the timing diagram 146 numbered 74-90 are addressed in the above discussion of the timing diagram 72 of FIG. 5, the discussion of elements numbered 74-90 is not reproduced in the discussion of FIG. 7 below.

Looking first to a point 148, a frame 1 with a target framebuffer A 24 is first developed in the first software frame processing stage (1) 82 following a VBL heartbeat numbered 0. When the stage is complete, software running on the CPU 12 issues a command indicating that the frame 1 is available for further processing. Accordingly, the final software frame processing stage (N) begins at a point 150, without waiting for a next VBL heartbeat (numbered 1). At a point 152, the first hardware frame processing stage (1) 86 begins, upon completion of which the final hardware frame processing stage (N) 88 may begin at a point 154. When the final hardware frame processing stage (N) 88 completes, completed frame 1 data is rendered into the target framebuffer A 24. At a subsequent VBL heartbeat numbered 3, the display step 90 begins and the display controller 30 reads the contents of the framebuffer A 24 for display on the display 32.

A point 158 represents the development of a frame 2 with a target framebuffer B 26 in the first software frame processing stage (1) 82, which begins following the VBL heartbeat numbered 1. As indicated by a balloon 160, the first software frame processing stage (1) 82 does not complete in a timely manner, finishing after the VBL heartbeat numbered 2. However, because the method of the flowchart 44 is employed, the final software frame processing stage (N) 84 may begin processing the frame 2 as soon as the first software frame processing stage (1) 82 completes and issues the command indicating the frame 2 is available for further processing. Thus, the final software frame processing stage (N) 84 begins at point a 162, without waiting for a subsequent VBL heartbeat.

Because the final software frame processing stage (N) 84 may begin processing the frame 2 as soon as the first software frame processing stage (1) 82 completes at the point 162, the first hardware frame processing stage (1) 86 may begin at a point 164 and the final hardware frame processing stage (N) 88 may begin at a point 166. Accordingly, because all of the series of steps 76 other than the display step 90 take place before a VBL heartbeat numbered 4, when the VBL heartbeat numbered 4 begins at a point 168, the display step 90 may begin for the frame 2.

Points 170 represent subsequent frames which are developed and targeted to the framebuffer C 28, the framebuffer A 24, the framebuffer B 26, the framebuffer C 28, and the framebuffer A 24, respectively. In the timing diagram 146, the subsequent frames at points 170 execute as desired.

Figure 8:
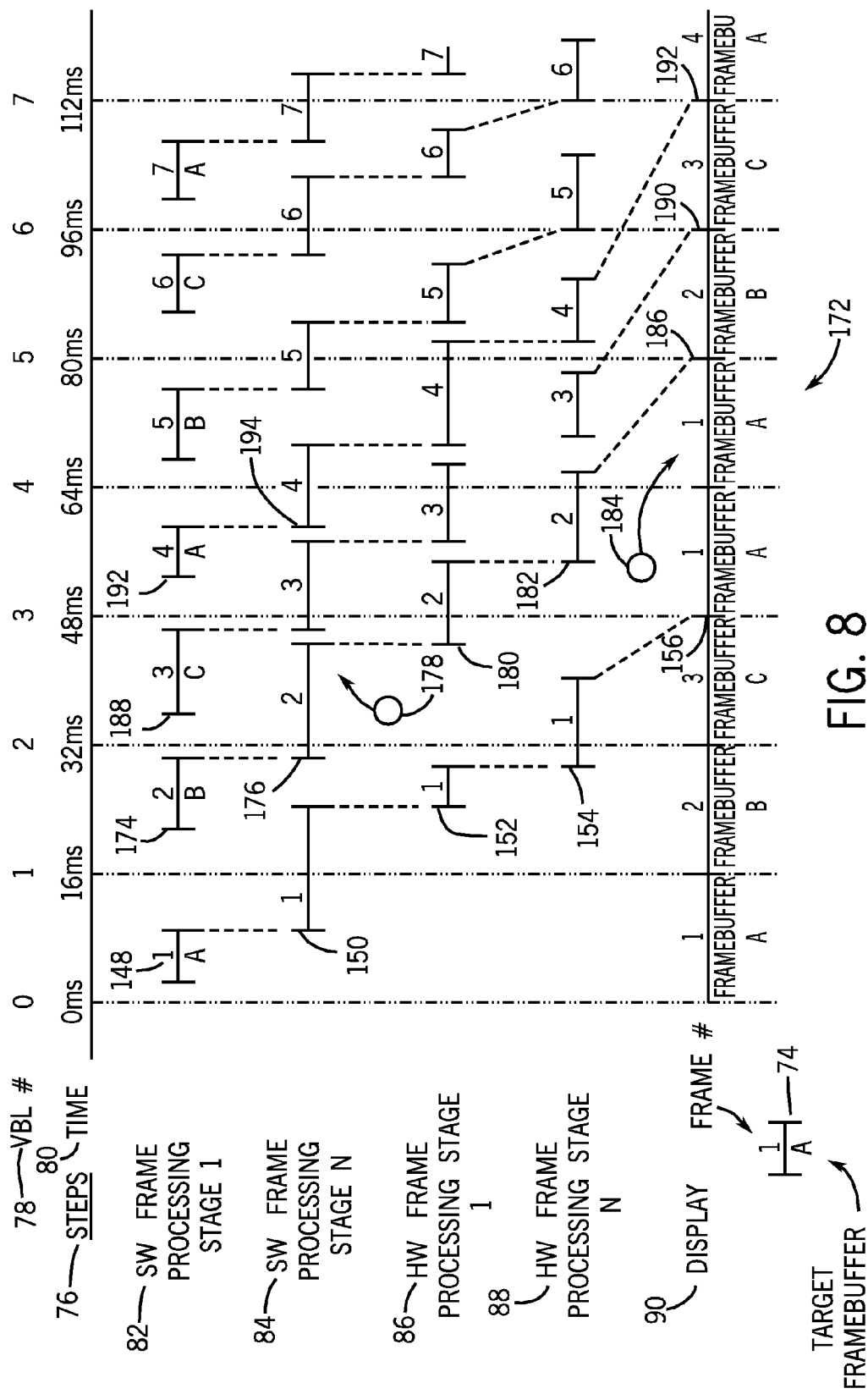
FIG. 8 is a timing diagram illustrating a sequence of processing a series of frames of graphics.

Turning to FIG. 8, a timing diagram 172 illustrates how employing the methods depicted in the flowcharts 44 and 58 may solve other potential problems illustrated in the timing diagrams 72 and 118 of FIGS. 5 and 6. Because elements of the timing diagram 172 numbered 74-90 are addressed in the above discussion of the timing diagram 72 of FIG. 5, the discussion of elements numbered 74-90 is not reproduced below. Moreover, because elements of the timing diagram 172 numbered 148-156 are addressed in the above discussion of timing diagram 146 of FIG. 7, the discussion of elements numbered 74-90 is not reproduced below.

Looking first to a point 174, a frame 2 with a target framebuffer B 26 is developed in the first software frame processing stage (1) 82, following a VBL heartbeat numbered 1. A point 176 illustrates that the final software frame processing stage (N) 84 begins immediately after the first software frame processing stage (1) ends. As indicated by a balloon 178, the final software frame processing stage (N) 84 does not complete in a timely manner. The processing of the frame 2 progresses to the first hardware frame processing stage (1) 86 at a point 180 and the final hardware frame processing stage (N) 88 at a point 182, but the final hardware frame processing stage (N) 88 does not complete rendering into the target framebuffer B 26 before the VBL heartbeat numbered 4. As a result, the display control 30 compensates by continuing to display the frame 1 from the framebuffer A 24. At a point 186, the display step 90 begins for the frame 2 from the framebuffer B 26.

A point 188 represents the development of a frame 3 with a target framebuffer C 28. As illustrated in the timing diagram 172, the frame 3 is executed as desired, reaching the display step 90 at a point 190 immediately following a VBL heartbeat numbered 6.

At a point 192, the development of a frame 4 with a target framebuffer A 24 begins. Though the frame 4 targets the framebuffer A 24, and the framebuffer A 24 is currently in use, the timing diagram 172 provides a different outcome from that of the timing diagram 118 of FIG. 6. Because the methods depicted in the flowcharts 44 and 58 are employed, the final software frame processing stage (N) 84 begins processing the frame 4 at a point 194 regardless of whether framebuffer A 24 is in use.

The frame 4 also begins the first hardware frame processing stage (1) 86 regardless of whether the framebuffer A 24 is in use. At the point when the final hardware frame processing stage (N) 88 begins processing the frame 4, the framebuffer A 24 is no longer in use, and the final hardware frame processing stage (N) 88 may thus undertake processing the frame 4. At a point 196, the frame 4 reaches the display step 90 in the framebuffer A 24. Unlike the result of the timing diagram 118, because the methods of the flowcharts 44 and 58 are employed, the frame 4 is not dropped in the timing diagram 172.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of processing a frame of image data for display on an electronic display, comprising:
preparing an entire frame of image data targeted to be written into a first framebuffer of at least two framebuffers, wherein the entire frame of image data is configured to be displayed on the electronic display for hardware graphics processing in a software frame processing stage when the first framebuffer is being accessed by the electronic display to display another entire frame of image data, each of the at least two framebuffers capable of storing the entire frame of image data or the other entire frame of image data;
performing a first hardware frame processing stage on the entire frame of image data when the first framebuffer is being accessed by the electronic display to display the other entire frame of image data; and
writing the entire frame of image data into the first framebuffer only when the first framebuffer is not being accessed by the electronic display to display the other entire frame of image data.

2. The method of claim 1, wherein rendering the entire frame of image data comprises checking whether the first framebuffer is being accessed by the display to display the other entire frame of image data with a register configured to track when the first framebuffer is being accessed by the electronic display to display the other entire frame of image data.

3. The method of claim 1, wherein preparing the entire frame of image data for hardware graphics processing in the software frame processing stage comprises using software running on one or more the central processing units.

4. The method of claim 1, wherein performing the first hardware frame processing stage comprises using one or more hardware graphics processors.

5. The method of claim 4, wherein performing the first hardware frame processing stage comprises performing pre-render hardware tile acceleration.

6. The method of claim 4, wherein performing the final hardware frame processing stage comprises performing hardware rendering to the first framebuffer.

7. A system comprising:
a display;
memory circuitry comprising at least two framebuffers, each of the at least two framebuffers capable of storing an entire frame of image data configured to be displayed on the display;
display control circuitry communicably coupled to the display and the memory circuitry, the display control circuitry configured to send pixel data that corresponds to the entire frame of image data from the at least two framebuffers to the display;
at least one central processing unit communicably coupled to the display control circuitry, the at least one central processing unit being configured to run software for a final software frame processing stage when a first framebuffer of the at least two framebuffers is being accessed by the display to display another entire frame of image data; and
at least one graphics processor communicably coupled to the memory circuitry and the at least one central processing unit, the at least one graphics processor being configured to conduct frame processing operations not involving writing the entire frame of image data to the first framebuffer when the first framebuffer is being accessed by the display and being configured to write the entire frame of image data into the first framebuffer only when the first framebuffer is not being accessed by the display to display the other entire frame of image data.

8. The system of claim 7, comprising a register communicably coupled to the at least one graphics processor, the register being configured to track whether the first framebuffer is being accessed by the display to display the other entire frame of image data.

9. The system of claim 7, wherein the at least two framebuffer comprises at least three framebuffers, each of which may serve as the first framebuffer.

10. The system of claim 7, wherein the first framebuffer is configured to provide hardware event interrupt notifications to software running on the at least one central processing unit.

11. The system of claim 7, wherein the first framebuffer is configured to be monitored by circuitry communicably coupled to the graphics processor and the display control circuitry.

12. The system of claim 7, comprising at least one of a network interface, an expansion slot, or non-volatile storage, or any combination thereof.

13. The system of claim 7, wherein the system comprises at least one of a media player, a cellular phone, or a personal data organizer, or any combination thereof.

14. A method of displaying a frame of pixels on an electronic display, comprising:
preparing an entire frame of image data targeted to be written into a first framebuffer of at least two framebuffers, wherein the entire frame of image data is configured to be displayed on the electronic display for hardware graphics processing when the first framebuffer is being accessed by the electronic display to display another entire frame of image data, each of the at least two framebuffers capable of storing the entire frame of image data or the other entire frame of image data;
conducting hardware frame processing not involving writing the entire frame of image data to the first framebuffer when the first framebuffer is being accessed by the electronic display to display the other entire frame of image data; and
after conducting hardware frame processing not involving writing the entire frame of image data to the first framebuffer, conducting frame processing involving writing the entire frame of image data to the first framebuffer only when the first framebuffer is not being accessed by the electronic display to display the other entire frame of image data.

15. The method of claim 14, comprising deferring conducting frame processing stages involving writing the entire frame of image data to the first framebuffer on the entire frame of image data until after a vertical blanking interrupt if the first framebuffer is being accessed by the electronic display to display the other entire frame of image data.

* * * * *